United States Patent Office 3,068,057
Patented Dec. 11, 1962

---

3,068,057
PROCESS FOR THE MANUFACTURE OF DYESTUFFS
Fritz Baumann, Leverkusen-Bayerwerk, and Hans-Samuel Bien, Leverkusen, Germany, assignors to Farbenfabriken Bayer Aktiengesellschaft, Leverkusen, Germany, a corporation of Germany
No Drawing. Filed Nov. 14, 1958, Ser. No. 773,819
Claims priority, application Germany Nov. 19, 1957
8 Claims. (Cl. 8—55)

This invention relates to novel dyestuffs and more particularly to dyestuffs especially suitable for the dyeing of synthetic fibers.

It has been found that valuable new blue dyestuffs are obtainable by reacting compounds which can be designated in one of their tautomeric forms as 3-imino-4,7-diamino-5,6-phthaloyl-isoindolenines which may be further substituted and which are substituted in the 1-position by an optionally etherified hydroxy group with primary aliphatic, cycloaliphatic or aromatic amines.

The isoindolenines may be still further substituted for example by halogen atoms, acylamino, hydroxy or further amino groups or further alkoxy groups.

The production of the compounds used as a starting material may be carried out by various methods known as such, for example similarly to the processes which are known for the manufacture of isoindolenines of the benzene series. The compounds substituted in the 1-position by alkoxy groups are obtainable for example by reacting 1,4-diaminoanthraquinone-2,3-dinitrile with an alkali metal alcoholate solution, for example a solution of sodium in methanol, ethanol, propanol, butanol, amylalcohol. Thereby it is not necessary that the reaction products are isolated before used for the process of our invention but the reaction mixture itself can be used directly for the reaction with the amines.

Primary aliphatic, cycloaliphatic or aromatic amines suitable for the process of the invention are for example 2-amino-ethanol, 1-amino-3-dimethyl-amino-propane, 1-amino-3-alkoxy-propane, 1-amino-3-methylamino-butane, allylamine, 3-amino-butanol-1, hexahydro-aniline, m- or p-amino-formanilide, m- or p-amino-acetanilide, m- or p-amino-methyl-formanilide, or m- or p-amino-methyl-acetanilide.

The reaction of the two components is expediently carried out in an inert solvent such as methanol, ethanol, benzene, nitrobenzene, chlorobenzene, dioxane, tetrahydrofurane, dimethylformamide, pyridine, diglycolmonoethyl ether or water or in an excess of amine, advantageously at a somewhat elevated temperature, e.g., at temperature between 20 and 200° C. The amines are used in at least equivalent amounts referred to the isoindolenines. Furthermore it is possible to react in a first reaction step 1 mol of the isoindolenine with about 1 mol of one amine and thereafter to react this reaction product in a second reaction step with a second mol of the same or another amine. The reaction with the second mol of the amine is carried out preferably at somewhat elevated temperature, e.g., temperatures above 90-100° C., since at lower temperatures in general only one mol of the amine reacts with the isoindolenine.

The new dyestuffs obtainable according to the invention are particularly suitable for the dyeing of synthetic fiber materials such as textiles from polyamide, polyester or acrylic acid nitrile fibers.

The following examples are given for the purpose of illustrating the invention without limiting it thereto. The parts are by weight.

*Example 1*

(a) 3.2 parts of 1-methoxy-4,7-diamino-5,6-phthaloyl-isoindolenine are suspended in 35 parts of methanol. After the addition of 35 parts of ethanolamine, the suspension is heated to the boil for several hours. The product is then allowed to cool, filtered off with suction and the residue is washed with methanol, until the discharge is almost colorless. Blue needles are thus obtained which dissolve in sulfuric acid with a red color, but in hydrochloric acid with a violet color. The vat is violent.

The analysis of the dyestuff, one of the tautomeric forms of which may be illustrated by the formula

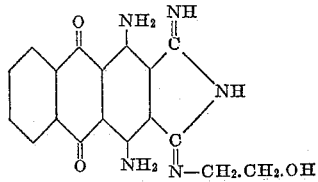

gives the following values.

$C_{18}H_{15}O_3N_5$.—Calculated: C, 61.9%; H, 4.3%; O, 13.8%; N, 20.0%. Found: C, 62.3%; H, 4.3%; O, 13.9% N, 19.3%.

In a finely divided form the dyestuff draws on polyester and polyamide fibers in very fast greenish blue shades. The dyeing may be carried out in known manner as follows:

Into a dyebath containing 0.1 part of the dyestuff, 400 parts of water and 8 parts of benzoic acid there are introduced 10 parts of polyester fiber at 25–30° C. and the temperature is raised to 100° C. within 20 minutes. This temperature is maintained for 1 hour, the fiber material is withdrawn and treated, after rinsing, at 70° C. for 20 minutes with a mixture of 5 parts of sodium hydroxide solution (38° Bé.) in 1000 parts of water. After acidification it is rinsed again.

In a similar manner polyamide fibers can be dyed by dyeing from a dyebath containing 0.1 part of the same dyestuff, 300 parts of water, 0.3 part of a usually applied dispersing agent, whereby said polyamide fibers are introduced into the dyebath at 40° C., and the temperature being raised to 100° C. within 20 minutes, and dyeing the fibers at this temperature for about one and a half hours. The fibers are then rinsed and dried.

The manufacture of 1-methoxy-4,7-diamino-5,6-phthaloyl-isoindolenine may be carried out in the following manner:

2,8 parts of sodium are dissolved in 280 parts of methanol; 28.8 parts of 1,4-diamino-anthraquinone-2,3-dinitrile are then added and the suspension is stirred at 60–70° C. for several hours. After cooling, the melt is filtered off with suction, washed with methanol until the discharge is colorless, and dried. The residue consists of dark blue small needles. The color of the solution in sulfuric acid is greenish blue, turning very rapidly to brown, in hydrochloric acid it is, however, red. Vat: bluish violet.

(b) Instead of the ethanolamine there can be used also equivalent amounts of the following amines: ethylenediamine, 1-amino-4-methylamino-butane, allylamine, 3-amino-butanol, 6-amino-decanol, cyclohexylamine, m- or p-amino-formanilide or p-amino-acetanilide, m- or p-aminomethyl-formanilide or m- or p-aminomethyl-acetanilide. The dyestuffs obtained have similar shades as the dyestuff obtained by the process described under (a).

(c) Instead of the isolated 1-methoxy-4,7-diamino-5,6-phthaloyl-isoindolenine there can be used also the reaction mixture obtained by producing this compound without isolation of the 1-methoxy-4,7-diamino-5,6-phthaloyl-isoindolenine. Thereby it is possible to proceed for example as follows:

5.9 grams of sodium methylate are dissolved in 300 ml.

of methanol. The solution is heated to about 60° C. Thereafter 30 grams of 1,4-diamino-2,3-dicyano-anthraquinone are introduced. Subsequently to the reaction mixture there are added 10 ml. of 2-amino-ethanol and the mixture is heated to the boil and kept at this temperature for several hours. Then the reaction mixture is cooled, the precipitate filtered off and washed with methanol and hot water.

Instead of the sodium methylate there can be used also an equivalent amount of sodium. The dyestuff obtained is identical with the dyestuff obtained by the procedure described under (a).

(d) 5 grams of the dyestuff obtained by the procedure described under (a) are added to a mixture consisting of 40 ml. of diglycol monomethyl ether, 10 ml. of 2-aminoethanol and 1 ml. of glacial acetic acid. This mixture is heated to 110° C. for 3 to 4 hours. The reaction product crystallizes in blue needles. It dissolves in formic acid with a somewhat bluer color than the starting material.

The dyestuff obtained dyes fibers of polyesters and polyamides in greenish-blue brilliant shades. The dyestuff can be characterized in one of its tautomeric forms by the following formula

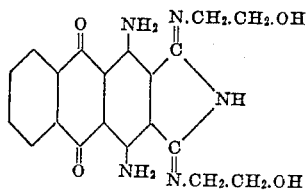

*Analysis.*—Calculated: $C_{20}H_{19}O_4N_5$. Found:

$C_{19.2}H_{18.8}O_4N_{4.7}$

The same dyestuff can be obtained directly if in the procedure described under (a) instead of methanol there is used diglycolmonomethyl ether.

Instead of the 2-amino-ethanol there can be used also the amines mentioned under (b). The dyestuffs obtained exhibit similar shades.

For the dyeing of the synthetic fiber materials there can be used also mixtures of the dyestuffs described under (a), (b) and (d).

Example 2

3.2 parts of 1-methoxy-3-imino-4,7-diamino-5,6-phthaloyl-isoindolenine are heated to the boil in a mixture of 35 parts of methanol and 9 parts of 1-methoxy-3-aminopropane for several hours. The cold suspension is filtered off with suction and washed with methanol, until the discharge is almost colorless. The compound crystallizes in bluish black prisms having a metallic sheen. It dissolves in hydrochloric acid with a violet color. The vat is bluish violet. The color of the solution in sulfuric acid is bluish red. Polyester fibers are dyed in very fast blue shades.

The dyestuff obtained can be characterized in one of its tautomeric forms by the following formula

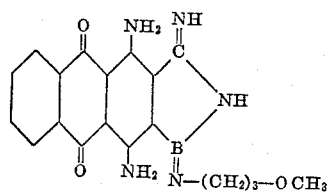

Instead of the above phthaloyl-isoindolenine there can be used also the corresponding compounds wherein the phthaloyl radical is substituted in the 3- and 6-position by a methoxy or hydroxy group or wherein the 4- resp. 5-position is substituted by a chloro-amino or acetyl amino group or wherein the 4- and 5-positions each are substituted by a chloro group or wherein the 3- resp. 6-positions are substituted by an amino or acetylamino group. The dyestuffs obtained have similar shades as the unsubstituted dyestuff described above.

Example 3

3.2 parts of 1-methoxy-4,7-diamino-5,6-phthaloyl-isoindolenine are added to a mixture of 32 parts of methanol and 10 parts of 1-amino-3-dimethylamino-propane and heated to the boil for several hours. The product is allowed to cool, washed with methanol, until the discharge is almost colorless, and the dyestuff is thus obtained as small blue needles in an almost quantitative yield. It dissolves in concentrated hydrochloric acid wtih a violet color. The vat is violet. The dyestuff dyes polyacrylonitrile fibers from an acetic acid bath in very fast blue shades.

The dyestuff obtained can be designated in one of its tautomeric forms by the following formula:

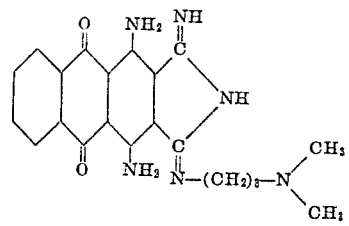

Example 4

6.1 grams of 1-hydroxy-3-imino-4,7-diamino-5,6-phthaloyl-isoindolenine (obtainable from 1,4-diamino-2,3-dicyan-anthraquinone by treatment with 100% sulfuric acid at 30° C. similarly to the process of German patent specification No. 950,949) are heated to the boil in a mixture of 24.4 cc. of 2-aminoethanol and 61 cc. of methanol for several hours. The initially amorphous substance is transformed into blue prisms in the course of the reaction. The cold product is filtered off with suction and the residue washed with methanol, until the discharge is almost colorless. The color of the solution is brown in sulfuric acid, bluish red in hydrochloric acid and bluish violet in formic acid. The finely divided dyestuff draws on polyester and polyamide fibers in very fast greenish blue shades. It has in one of its tautomeric forms the following constitution:

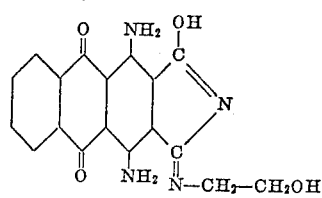

Example 5

6.4 grams of 1-hydroxy-2-methyl-3-imino-4,7-diamino-5,6-phthaloyl-isoindolenine (obtainable from 1-imino-3-oxo-4,7-diamino-5,6-phthaloyl-isodihydroindole by methylation in pyridine with p-toluene-sulfonic acid methyl ester) are heated to the boil in a mixture of 25.6 cc. of 2-aminoethanol and 64 cc. of methanol for several hours. The cold product is filtered off with suction and the residue washed wtih methanol, until the discharge is almost colorless. The color of the solution is reddish brown in sulfuric acid, bluish red in hydrochloric acid and bluish violet in formic acid. The dyestuff draws on polyester or polyamide fibers in a very clear greenish blue shade.

Example 6

6.1 grams of 1-imino-3-hydroxy-4,7-diamino-5,6-phthaloyldihydroisoindolenine are heated to the boil in a mixture of 24.4 cc. of 1-amino-3-dimethylamino-propane and 61 cc. of methanol for several hours. The blue prisms thus formed are filtered off with suction and washed with methanol. The color of the solution is brown in sulfuric acid, bluish red in hydrochloric acid and dull violet in formic acid. The dyestuff draws from an acetic acid bath on acrylic acid nitrile fibers or copolymers containing mainly acrylonitrile in fast blue shades.

The dyestuff obtained can be designated in one of its tautomeric forms by the following formula

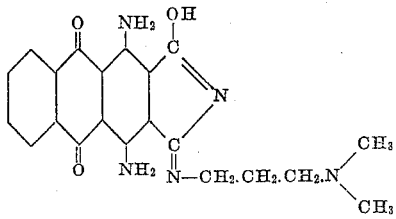

We claim:
1. A dyestuff which in one of its tautomeric forms is of the formula:

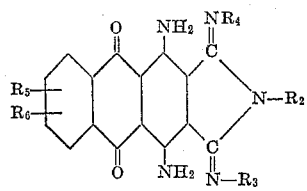

wherein $R_2$ represents a member selected from the group consisting of hydrogen and a lower alkyl group, $R_3$ and $R_4$ each represent a member selected from the group consisting of cyclohexyl, lower alkyl, lower alkenyl, amino-lower-alkyl, hydroxy-lower-alkyl and lower-alkoxy-lower alkyl, and wherein $R_5$ and $R_6$ each represent a member selected from the group consisting of hydrogen, chlorine, lower alkoxy, hydroxy, formylamino and acetylamino.

2. A dyestuff of the following formula

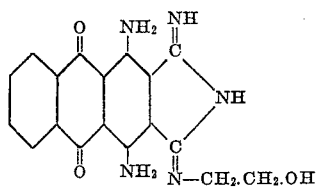

3. A dyestuff of the following formula

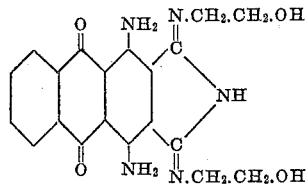

4. A dyestuff of the following formula

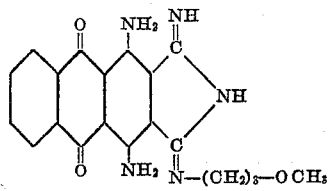

5. A dyestuff of the following formula

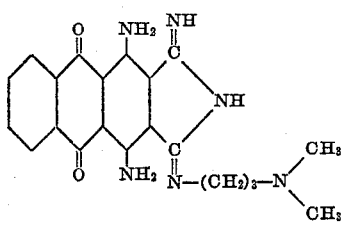

6. A dyestuff which in one of its tautomeric forms is of the formula:

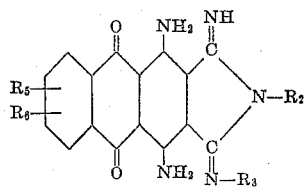

wherein $R_2$ represents a member selected from the group consisting of hydrogen and a lower alkyl group, $R_3$ represents a member selected from the group consisting of cyclohexyl, lower alkyl, lower alkenyl, amino-lower-alkyl, hydroxy-lower-alkyl and lower-alkoxy-lower alkyl; and wherein $R_5$ and $R_6$ each represent a member selected from the group consisting of hydrogen, chlorine, lower alkoxy, hydroxy, formylamino and acetylamino.

7. A poly-acrylo-nitrile fiber dyed with a dyestuff which in one of its tautomeric forms is of the formula:

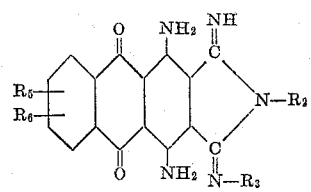

wherein $R_2$ represents a member selected from the group consisting of hydrogen and a lower alkyl group, $R_3$ represents a member selected from the group consisting of cyclohexyl, lower alkyl, lower alkenyl, amino-alkyl, hydroxy-lower-alkyl and lower-alkoxy-lower alkyl; and wherein $R_5$ and $R_6$ each represent a member selected from the group consisting of hydrogen, chlorine, lower alkoxy, hydroxy, formylamino and acetylamino.

8. A poly-acrylo-nitrile fiber dyed with a dyestuff which in one of its tautomeric forms is of the formula:

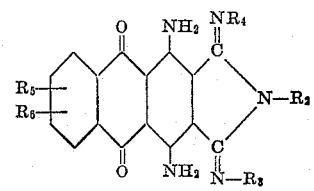

wherein $R_2$ represents a member selected from the group consisting of hydrogen and a lower alkyl group, $R_3$ and $R_4$ each represent a member selected from the group consisting of cyclohexyl, lower alkyl, lower alkenyl, amino-lower-alkyl, hydroxy-lower-alkyl and lower-alkoxy-lower alkyl, and wherein $R_5$ and $R_6$ each represent a member selected from the group consisting of hydrogen, chlorine, lower alkoxy, hydroxy, formylamino and acetylamino.

References Cited in the file of this patent
UNITED STATES PATENTS

| 2,537,352 | Jones | Jan. 9, 1951 |
| 2,628,963 | Laucius et al. | Feb. 17, 1953 |
| 2,739,154 | Rosch et al. | Mar. 20, 1956 |

FOREIGN PATENTS

| 773,212 | England | Apr. 24, 1957 |

OTHER REFERENCES

Elvidge et al.: J. Chem. Soc. (London), pp. 5000–5002 (1952).

Clark et al.: J. Chem. Soc. (London), pp. 3593–3595 (1953).